United States Patent

Kjos

[15] 3,645,471

[45] Feb. 29, 1972

[54] APPARATUS FOR GUIDING TAPE BETWEEN TWO PLANES

[72] Inventor: Magne Jarle Kjos, Agoura, Calif.

[73] Assignee: Burroughs Corporation, Detroit, Mich.

[22] Filed: Sept. 8, 1970

[21] Appl. No.: 70,239

[52] U.S. Cl. ..............................242/182, 242/193, 226/97, 352/156

[51] Int. Cl. ...............G11b 15/32, G11b 15/58, G11b 23/12

[58] Field of Search ....................242/76, 182, 193, 194, 180; 352/156; 226/95, 97

[56] References Cited

UNITED STATES PATENTS

| | | | |
|---|---|---|---|
| 3,443,766 | 5/1969 | Rayfield et al. | 242/193 X |
| 3,460,780 | 8/1969 | Kjos | 242/180 |

*Primary Examiner*—Leonard D. Christian
*Attorney*—Christie, Parker & Hale

[57] ABSTRACT

Tape on a storage reel is guided to a work plane canted relative to the reel by a tape guide and a vacuum column. The tape guide has a tape-guiding surface that is perpendicular to the plane of the tape on the reel. The vacuum column lies in the work plane and has an outer sidewall that coincides with the line of intersection of the two planes. A tape cleaner is placed on or near the tape guide.

13 Claims, 2 Drawing Figures

Patented Feb. 29, 1972 3,645,471

INVENTOR.
MAGNE JARLE KJOS

BY

Christie, Parker & Hale
ATTORNEYS

APPARATUS FOR GUIDING TAPE BETWEEN TWO PLANES

BACKGROUND OF THE INVENTION

This invention relates to tape-handling apparatus and, more particularly, to an improved arrangement of tape-handling components that guides tape between two planes without exerting a lateral force on the tape.

A space-saving expedient in the design of tape-handling apparatus is to arrange the two tape storage reels coaxially one on top of the other. When a pair of reels is so arranged, it is obviously not possible to place both the reels so the tape travels between them and past a transducer all in a single plane. Accordingly, the reels are usually designed to be canted with respect to the work plane along which the tape is transported past the transducer. Tape from one reel extends downward toward the work plane while tape from the other reel extends upward toward the work plane. Thus, the tape travels along two different planes—the plane of the reel and the work plane.

U.S. Pat. No. 3,443,766, which issued May 13, 1969, in the names of Harry F. Rayfield and Magne Jarle Kjos, discloses a criterion for guiding tape between first and second planes without exerting a lateral force on the tape. The exertion of a lateral force on the tape is objectionable because it necessitates measures to control the lateral position of the tape and tape wear results. According to the criterion, the tape path extends along the first plane to the intersection of the two planes, bends about an axis perpendicular to the first plane, extends for a distance along the line of intersection, bends about an axis perpendicular to the second plane, and then extends along the second plane.

The specific embodiment disclosed in U.S. Pat. No. 3,443,766 employs a pair of cylindrical guide rollers that lie on the line of intersection of the two planes, the axis of one of the rollers being perpendicular to the first plane and the axis of the other roller being perpendicular to the second plane. Thus, the tape extends along the first plane, twists between the planes as it extends along the line of intersection, and then extends along the second plane. The two rollers must be spaced far enough apart to prevent the tape from twisting too much as it extends along the line of intersection. This consideration lengthens the tape path and thereby increases the space occupied by the tape-handling apparatus.

SUMMARY OF THE INVENTION

The invention is based upon the criterion disclosed in U.S. Pat. No. 3,443,766, but utilizes different tape-handling components to guide tape from one plane to another in an advantageous manner. Specifically, a vacuum column is employed to form one of the bends in the tape. The outer sidewall of the vacuum column coincides with the line of intersection of the two planes. Consequently, the twist in the tape required to make the transition between the two planes can be introduced inside the vacuum column, so the tape path outside the vacuum column does not have to be lengthened in order to guide tape between two planes.

In the preferred embodiment of the invention, two coaxial tape storage reels are canted several degrees with respect to a work plane in which two vertical vacuum columns, a transducer, and other tape-handling components are disposed. The reels are canted so the line of intersection of the plane of the tape on each reel and the work plane coincides with the outer sidewall of one of the vacuum columns. A tape-guiding element having a cylindrical surface is spaced slightly inward from the outer sidewall of each vacuum column so the tape between the reel and the vacuum column bends about an axis perpendicular to the plane of the tape stored on the reel, i.e., about an axis parallel to the reel axis. As the tape extends into the vacuum column from the bend, it coincides approximately with the line of intersection.

A feature of the invention is the placement of tape cleaners on or near the tape guiding elements so as to minimize the effect of the drag of the tape cleaners on the acceleration and deceleration of the tape in the course of its transport.

BRIEF DESCRIPTION OF THE DRAWING

The features of a specific embodiment of the best mode contemplated of carrying out the invention are illustrated in the drawing, in which.

DETAILED DESCRIPTION OF THE SPECIFIC EMBODIMENT

Figure 1:
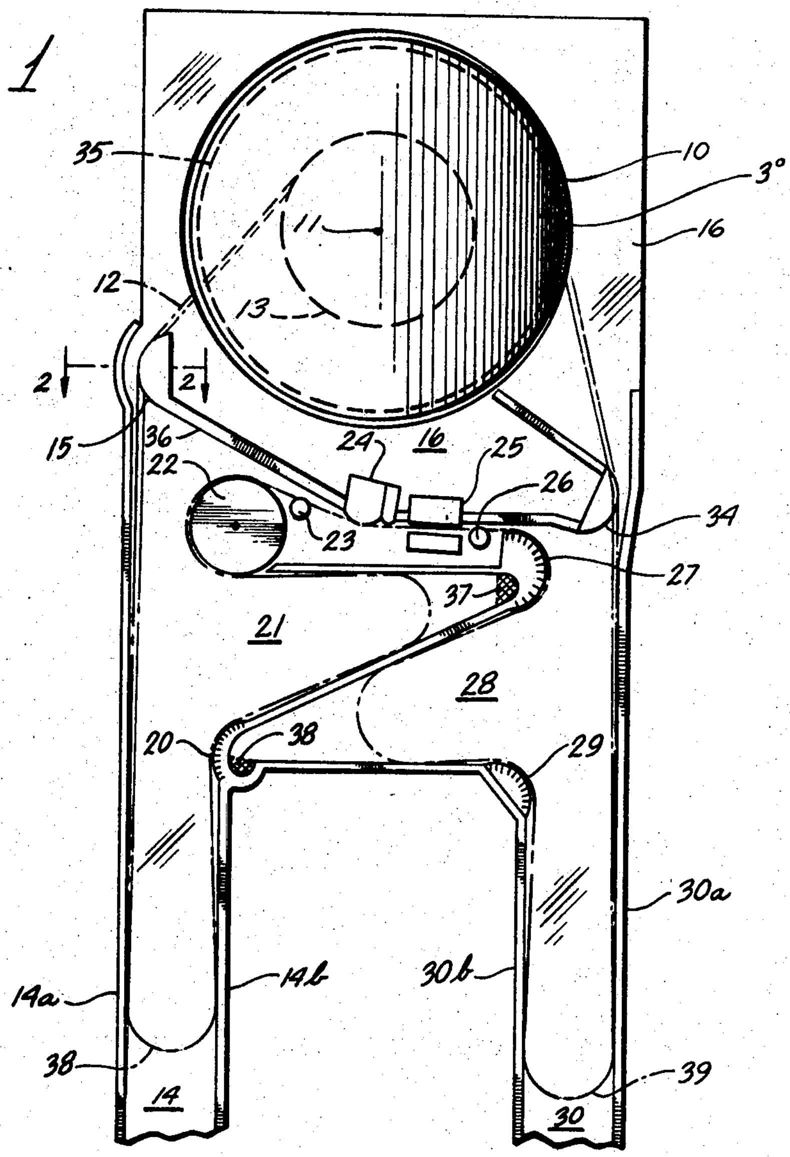
FIG. 1 is a schematic side elevation view of tape handling apparatus incorporating the principles of the invention.

In the drawing a pair 10 of coaxial tape storage reels is mounted about a horizontal axis 11. Preferably, these reels are independently driven by two motors (not shown). A tape 12 extends from a tape roll 13 on one of the reels into a passage defined by the outer sidewall **14*a* of a vacuum column 14 and a tape-guiding element 15. The reels of pair 10 are canted at a small angle, e.g., 3°, relative to a vertical backplate 16 on which the components of the tape-handling apparatus are mounted. Backplate 16 is parallel to a vertical work plane along which tape 12 travels. Tape from one reel extends forward to the work plane and tape from the other reel extends rearward to the work plane. Tape 12 forms a slack loop in vacuum column 14 and extends across a guiding surface 20 to a convergent vacuum buffer 21 in which it forms a smaller slack loop. From buffer 21, tape 12 is wrapped around a bidirectional drive capstan 22 and extends between compliant edge guides 23 and 26. A principal transducer head 24 and an auxiliary transducer head 25 are disposed in the tape path between compliant guides 23 and 26, all of which are mounted on backplate 16. From compliant guide 26, tape 12 is wrapped around a guiding surface 27 and forms a small loop in a convergent vacuum buffer 28. Tape 12 extends from buffer 28 across a guiding surface 29 and forms a slack loop in a vacuum column 30. Buffers 21 and 28 are arranged back-to-back above vacuum columns 14 and 30 and below the portion of the tape path extending between buffers 21 and 28. From vacuum column 30, tape 12 extends through a passage defined by a tape-guiding element 34 and the outer side wall 30*a* of vacuum column 30 and is wrapped around a tape roll 35 on the other reel. A partition 36 extends between tape-guiding elements 15 and 34**.

In summary, components 14, 20, 21, 22, 23, 24, 25, 26, 27, 28, 29, and 30 are disposed in the vertical work plane, i.e., handle tape during transport along a plane parallel to backplate 16.

Tape-guiding elements 15 and 34, and tape-guiding surfaces 20, 27, and 29 each have perforations, represented by the small slashes in FIG. 1, through which air is forced to form an air bearing to support the tape. Thus, the tape does not contact these tape-guiding surfaces. Vacuum column 14 is formed by outer sidewall **14*a*, an inner sidewall 14*b*, backplate 16 and a transparent cover plate 50. Vacuum column 30 is formed by outer sidewall 30*a*, an inner sidewall 30*b*, backplate 16, and cover plate 50. Operating in the conventional manner, vacuum columns 14 and 30 each have loop length sensors that control the respective reel drive motors to hold the loop lengths within prescribed limits. A vacuum formed in vacuum columns 14 and 30 underneath the slack loops draws the tape toward the bottom of vacuum columns. Buffers 21 and 28 have converging sides and vacuum sources 37 and 38, respectively, at the point where the sides meet. Vacuum sources 37 and 38 could be provided by the same vacuum pump that forms the vacuum in vacuum columns 14 and 30. Capstan 22 is driven by a bidirectional motor (not shown) so tape 12 can be driven in either direction past transducer heads 24 and 25**.

The surfaces of elements 15 and 34 have perforations with sharp edges at the point of tangency of the tape extending thereto from reel pair 10, so as to form a tape cleaner that scrapes dust and other foreign particles from the tape in advance of the air bearings. By placing each tape cleaner outboard of the vacuum columns, i.e., in the tape path between a vacuum column and one of the reels rather than between the two vacuum columns, the effect of the tape drag exerted by the tape cleaners on the acceleration and deceleration of the tape in the course of its transport is minimized because the vacuum columns and tape buffers isolate the tape cleaners from the tape drive capstan. In other words, the tape cleaners do not impede the initial acceleration or deceleration of the tape by the tape drive capstan, because of the slack loops in the vacuum columns and buffers. Accordingly, the available force of capstan 22 is most efficiently utilized to accelerate and decelerate tape 12.

U.S. Pat. No. 3,443,766 defines a criterion for guiding tape from one plane to another without exerting lateral forces on the tape. For the purpose of setting forth this criterion, there is defined an imaginary line of intersection between a first plane in which the centerline of the tape stored on a storage reel lies and a second plane (i.e., the work plane) in which the centerline of the tape extending across backplate 16 lies. The criterion dictates that the centerline of the tape path extends from the reel along the first plane to the line of intersection; at the line of intersection, the centerline of the tape path bends about an axis perpendicular to the first plane until the centerline of the tape path coincides with the line of intersection; the centerline of the tape path extends away from this bend coincident with the line of intersection, bends about an axis perpendicular to the second plane, and extends in the desired direction of tape transport along the work plane. While the centerline of the tape path coincides with the line of intersection, the tape twists between the first and second planes. Accordingly, the two bends must be spaced sufficiently far apart to prevent tape damage or impairment of tape transport. To meet the described criterion according to the present invention, reel pair 10 is oriented so the lines of intersection lie in the planes of sidewalls 14*a* and 30*a*, respectively. The guiding surfaces of elements 15 and 34 against which the air bearing is formed are cylindrical, i.e., generated by revolving a line about an axis parallel to the line. This axis is oriented perpendicular to the first plane and the generated surfaces are spaced slightly inward from sidewalls 14*a* and 30*a*, respectively. Thus tape 12 is spaced slightly from side walls 14*a* and 30*a*, as it extends from guiding elements 15 and 34 into vacuum columns 14 and 30 respectively, and contacts sidewalls 14*a* and 30*a* only at the bends in the slack loops designated 38 and 39. This reduces tape wear considerably in vacuum columns 14 and 30. Since tape 12 is spaced slightly from sidewalls 14*a* and 30*a*, it only coincides approximately with the line of intersection; but this approximation is close enough to eliminate lateral forces on tape 12.

Figure 2:
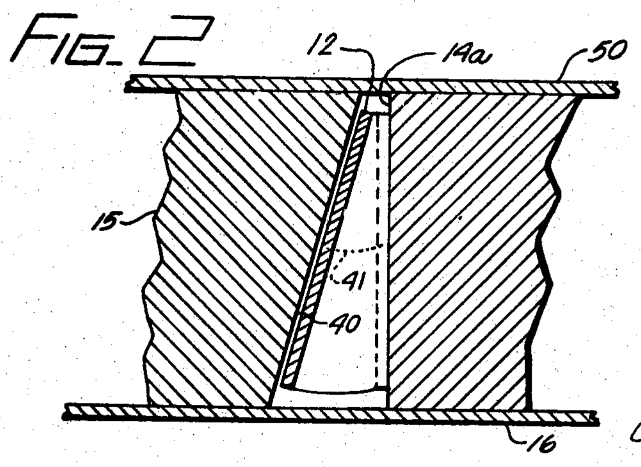
FIG. 2 is a top section view of a portion of the apparatus shown in FIG. 1.

In FIG. 2 the guiding surface of element 15 is depicted at 40, and the centerline of tape 12 is depicted by a dotted line 41. Thus, it can be seen that the centerline of tape 12 only lies in the plane of outer sidewall 14*a* at the beginning of the bend of the slack loop. Between element 15 and the beginning of the bend of the slack loop, the centerline of tape 12 gradually approaches outer sidewall 14*a*. The vacuum formed in vacuum column 14 underneath the slack loop draws tape 12 at the beginning of the bend of the slack loop against sidewall 14*a*, but does not prevent the length of tape 12 from assuming its natural tape path, between element 15 and the beginning of the bend of the slack loop. It should be noted that, since vacuum column 14 lies in the work plane, it bends tape 12 about an axis perpendicular to the work plane. Thus, vacuum columns 14 and 30 serve as an effective instrumentality for guiding tape 12 between the first and second planes in addition to their conventional function. The nature of tape guiding elements 15 and 34 is not essential to the broader aspects of the invention.

In laying out the arrangement of components, it is most advantageous from the point of view of ease of manufacture to place the vacuum columns so their sidewalls are precisely vertical and to orient and place reel pair 10 accordingly, i.e., such that the plane of the centerline of tape on each reel intersects the plane of the center line of tape on the work surface precisely in the plane of the outer sidewalls of each vacuum column.

The described embodiment of the invention is only considered to be preferred and illustrative of the invention concept; the scope of the invention is not to be restricted to such embodiment. Various and numerous other arrangements may be devised by one skilled in the art without departing from the spirit and scope of this invention. For example, any number of other types of tape guiding elements including rollers could be substituted for elements 15 and 34, tape buffers 21 and 28 could be eliminated, separate capstans could be used for forward and reverse transport, and roller-type guides could be employed instead of air bearings. Furthermore, the term "-tape" as used in this specification refers to elongated, flexible media in general such as film, magnetic tape, or paper tape.

What is claimed is:

1. Apparatus for transporting tape along a tape path, the apparatus comprising:

a length of tape;

first means for guiding the tape so its centerline along a first portion of the tape path lies in a first plane;

second means for guiding the tape so its centerline along a second portion of the tape path lies in a second plane that is canted with respect to the first plane; and a vacuum column for guiding the tape so its centerline along a third portion of the tape path intermediate the first and second portions coincides approximately with the line of intersection of the first and second planes.

2. The apparatus of claim 1, in which the vacuum column lies in the second plane and has an outer sidewall that coincides with the line of intersection of the first and second planes, the vacuum column guiding the tape to form a fourth portion of the tape path intermediate the first and third portions, the third and fourth portions of the tape path defining a slack loop in the vacuum column.

3. The apparatus of claim 1, in which the vacuum column lies in the second plane and has two sidewalls, one of which coincides with the line of intersection of the first and second planes, the tape approaching the sidewall as it extends into the vacuum column such that the tape twists along the third portion and contacts the sidewalls of the vacuum column at the bend in the slack loop.

4. The apparatus of claim 3, in which the first guiding means comprises a tape storage reel oriented so the centerline of the tape stored thereon lies in the first plane and means at the intersection of the first and third portions of the tape path for bending the tape about an axis perpendicular to the first plane.

5. In a tape-handling system, the combination comprising:

a work surface;

a pair of coaxially arranged tape storage reels, said pair being canted at an angle with respect to the work surface such that tape extends upwardly from one of the reels toward the work surface and such that tape extends downwardly from the other reel toward the work surface;

guiding means and a vacuum column individual to each of the reels, the guiding means bending the tape extending from such reel into the vacuum column to form a slack tape loop the outside of which is twisted relative to the tape on such reel and the tape of the inside of the slack loop; and means for guiding the tape along the work surface between the vacuum columns untwisted relative to the tape of the insides of the slack loops.

6. The combination of claim 5, in which:

the guiding means individual to each of the reels bends the tape extending from such reel about an axis parallel to the axis of the reel pair and into approximate coincidence with the line of intersection between the tape along the work surface and the tape on such reel;

the vacuum column individual to each of the reels lying in the work plane such that the outer sidewall of the vacuum column coincides approximately with the line of intersection, the tape extending from the guiding means into the vacuum column to form a slack loop.

7. The combination of claim 6, additionally comprising tape cleaning means disposed in the tape path between one of the vacuum columns and the corresponding reel.

8. The combination of claim 7, additionally comprising a bidirectional capstan along the work surface that drives the tape between the vacuum columns.

9. The combination of claim 8, in which the work surface is vertical, the reels are arranged on a horizontal axis, the vacuum columns are spaced apart and vertical, and the means for guiding the tape along the work surface between the vacuum columns comprises: a first convergent vacuum buffer and a second convergent vacuum buffer arranged horizontally back-to-back above the vacuum columns such that the tape path from one vacuum column extends through the first buffer, across the capstan, over the buffers, and through the second buffer to the other vacuum column; and a transducer head disposed in the tape path over the buffers.

10. The combination of claim 9, in which the guiding means individual to each of the reels for bending the tape comprises a guiding surface and means for generating an air bearing between the guiding surface and the adjacent tape.

11. The combination of claim 10, in which the means for guiding the tape along the work surface additionally comprises a first guiding surface between the one vacuum column and the first buffer, a second guiding surface between the portion of the tape path over the buffers and the second buffer, and a third guiding surface between the second buffer and the other vacuum column, and means for generating an air bearing between the first, second, and third guiding surfaces and the adjacent tape.

12. In a tape handling apparatus having:

a work surface, a rotatable tape storage reel canted at an angle with respect to the work surface, first means for guiding such tape in a first segment of tape path formed along the work surface so such tape centerline lies in a first plane parallel to the work surface, second means for guiding such tape in a second segment of tape path formed between the reel and the work surface so such tape centerline lies in a second plane perpendicular to the axis of rotation of the reel, and said first and second means cooperating so as to guide such tape in a third segment of tape path intermediate the first and second segments so there are changes in tape path direction between the first and third segments and between the second and third segments and so such tape centerline of the third segment substantially coincides with the line of intersection of the first and second planes, the the improvement comprising first guiding means that is a vacuum column the outer sidewall of which coincides with the line of intersection.

13. Apparatus for transporting tape along a tape path, the apparatus having a length of tape, first means for guiding the tape so its centerline along a first portion of the tape path lies in a first plane, second means for guiding the tape so its centerline along a second portion of the tape path lies in a second plane that is canted with respect to the first plane, and third means for guiding the tape so its centerline along a third portion of the tape path intermediate the first and second portions substantially coincides with the line of intersection of the first and second planes, the improvement comprising a vacuum column the outer sidewall of which is the third means and the inner sidewall of which is the second means.

* * * * *